United States Patent [19]

Ellison

[11] 3,818,202

[45] June 18, 1974

[54] BINARY BYPASSABLE ARITHMETIC LINEAR MODULE

[75] Inventor: James T. Ellison, Minneapolis, Minn.

[73] Assignee: Sperry Rand Corporation, New York, N.Y.

[22] Filed: Feb. 20, 1973

[21] Appl. No.: 333,833

[52] U.S. Cl. .................. 235/156, 235/152, 307/207

[51] Int. Cl. ............................................ G06f 7/38

[58] Field of Search ..... 235/152, 156, 175, 153 AC; 307/207

[56] References Cited

UNITED STATES PATENTS

| | | | |
|---|---|---|---|
| 3,291,974 | 12/1966 | Even | 235/152 X |
| 3,562,502 | 2/1971 | Kautz | 235/152 |
| 3,584,205 | 6/1971 | Malaby et al. | 235/152 |
| 3,619,583 | 11/1971 | Arnold | 235/152 |
| 3,731,073 | 5/1973 | Moylan | 235/152 |

*Primary Examiner*—Malcolm A. Morrison
*Assistant Examiner*—James F. Gottman
*Attorney, Agent, or Firm*—Kenneth T. Grace

[57] ABSTRACT

A bypassable module for performing an arithmetic linear function is disclosed. The module utilizes well-known binary elements to construct a novel combination thereof that given three multibit binary input signals C, D, X and the single bit binary input signal b generates the alternative output functions $$C \text{ if } b = O$$

or $$CX + D \text{ if } b = 1.$$

Additionally, disclosed is a linear tree incorporating a plurality of such modules for generating a polynomial of a degree that is determined by the number of modules not bypassed.

2 Claims, 5 Drawing Figures

BINARY BYPASSABLE ARITHMETIC LINEAR MODULE

BACKGROUND OF THE INVENTION

In the data processing field in which complex arithmetic operations are performed it is desirable that the arithmetic unit be sufficiently versatile to perform all arithmetic operations while having a sufficient modularity to permit the construction thereof of a minimum number of different types of modules. Additionally, it is desirable that such modules be constructed of well-known binary elements in large scale integration (LSI) arrays to utilize the fastest and most economical features of the present state of art.

In the prior art there are proposed various algorithms whereby an arithmetic linear module having the input signals $a$, $b$, $x$ and producing the output signals $ax + b$ can be used iteratively to generate nearly every function that is required for the arithmetic unit of a data processing system. Such proposed algorithms for dividing, computing the square root, integrating and tracking as well as algorithms for nonlinear functions. Thus, entire arithmetic units can be synthesized by the iterative use of such arithmetic linear modules. It is thus an object of the present invention to provide an arithmetic linear module that may utilize such algorithms and that may be fabricated in LSI arrays while permitting the bypassing of one or more of such modules if such one or more modules are defective. Thus, LSI arrays of maximized reliability, yield, and failure recovery capabilities and minimized electronic redundancy and complexity are provided while yet performing the desired arithmetic operations.

SUMMARY OF THE INVENTION

The binary bypassable arithmetic linear module of the present invention is constructed of a known arithmetic linear module and a known bypass switch. The arithmetic linear module receives three multibit binary input signals C, D, X and generates the output signal CX + D. The output signal CX + D from the arithmetic linear module and the input signal C are both then coupled as input signals to the bypass switch which generates, under control of the single bit third binary input signal $b$, the alternative output signals $$C \text{ if } b = 0$$

or $$CX + D \text{ if } b = 1.$$

Thus, if it is determined that the arithmetic linear module is defective, i.e., not capable of generating the desired CX + D output signal upon the enabling thereof of the input signal $b = 1$ such arithmetic linear module may be disabled by the input signal $b = 0$ whereby the bypassed operation is performed by another cascaded binary bypassable arithmetic linear module in an LSI array of such binary bypassable arithmetic linear modules. Accordingly a tree of such binary bypassable arithmetic linear modules may be constructed, which tree includes one or more of such binary bypassable arithmetic linear modules than are known to be required to perform the desired arithmetic operation, such that large quantity production runs of such LSI arrays may be economically fabricated.

DESCRIPTION OF THE PREFERRED EMBODIMENT

Figure 1:
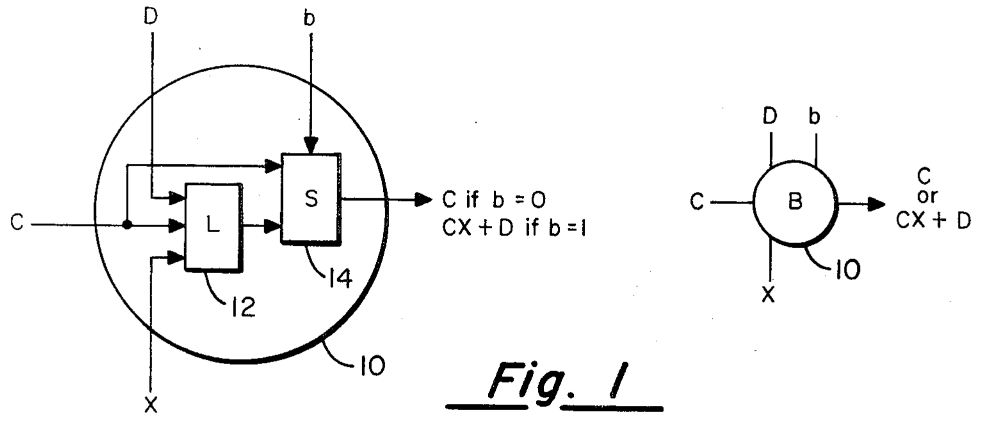
FIG. 1 is a block diagram of the binary bypassable arithmetic linear module of the present invention.

With particular reference to FIG. 1 there is presented an illustration of a block diagram of the binary bypassable arithmetic linear module and the symbol therefor of the present invention. Binary bypassable arithmetic linear module 10 consists of an arithmetic linear module 12 and a bypass switch 14. Arithmetic linear module 12 receives three multibit binary input signals C, D, X and generates the output signal CX + D. The output signal CX + D from the arithmetic linear module 12 and the input signal C are both then coupled as input signals to the bypass switch 14 which provides, under control of a single bit third binary input signal $b$, the alternative output signals $$C \text{ if } b = 0$$

or $$CX + D \text{ if } b = 1.$$

Figure 2:
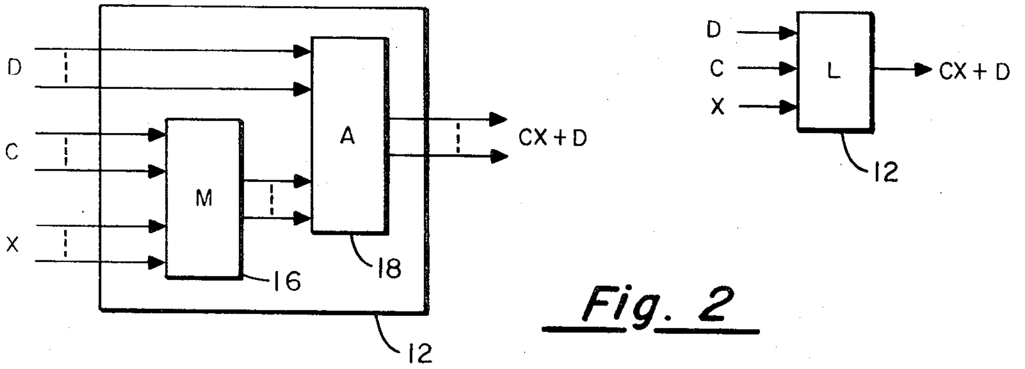
FIG. 2 is a block diagram of the arithmetic linear module utilized to implement the module of FIG. 1.

With particular reference to FIG. 2 there is presented a block diagram of the arithmetic linear module 12 and the symbol therefor utilized to implement module 10 of FIG. 1. Arithmetic linear module 12 is comprised of two well-known binary arithmetic elements, binary multipler 16 and binary adder 18. Binary multiplier 16 receives two multibit binary input signals C, X and generates the output signal CX. The output signal CX from the binary multiplier 16 and a third multibit binary input signal D are both coupled as input signals to the binary adder 18 which generates the output signal CX + D.

Figure 3:
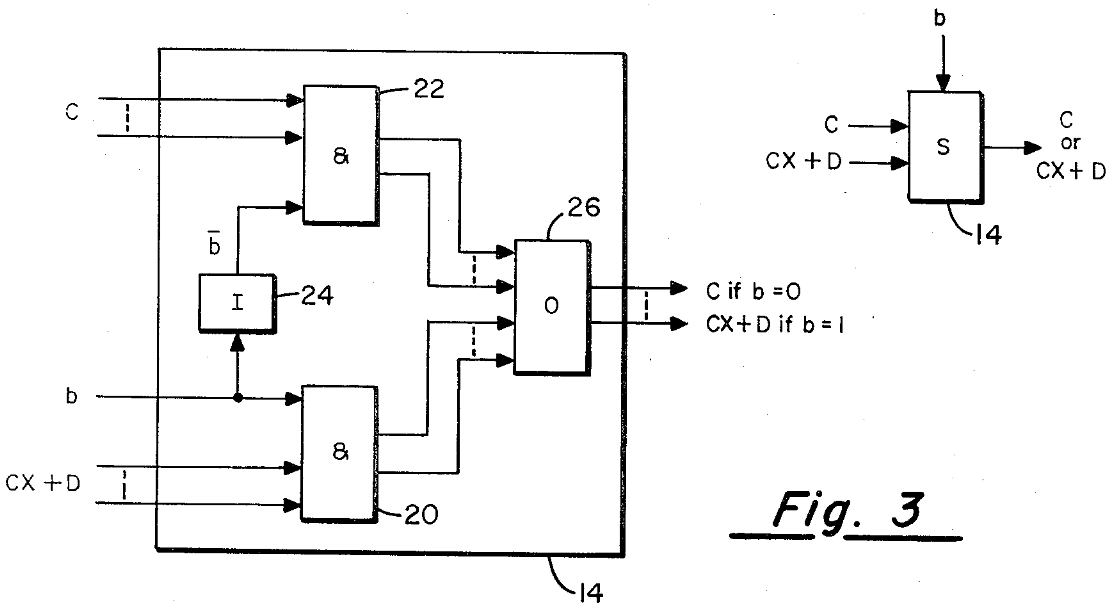
FIG. 3 is a block diagram of the bypass switch utilized to implement the module of FIG. 1.

With particular reference to FIG. 3 there is presented an illustration of a block diagram of the bypass switch 14 that is utilized to implement module 10 of FIG. 1. Bypass switch 14 may consist of four well-known Boolean elements: AND gates 20, 22; Inverter 24; and, OR gates 26. AND gates 20 receive the multibit binary input signal CX + D and the single bit binary input signal b while and gates 22 receive the multibit binary input signal C and through Inverter 24 the complement of the input signal $b$ i.e., $\bar{b}$. The output signals from AND gates 20, $CX + D$ if $b = 1$ or $C$ from AND gates 22 if $b = 0$ are coupled as first and second multibit binary input signals to OR gates 26 which emit the output signals $CX + D$ or $C$, alternatively, under control of the single bit binary input signal $b$.

As stated hereinabove the present invention is directed toward a method of implementing an LSI array for implementation in the arithmetic section of a data processing system. The preferred LSI array should, using various algorithms, be capable of generating nearly every mathematical function. It should permit the use thereof even though certain portions thereof are defective or faulty. The binary bypassable arithmetic linear module 10 of the present invention may be utilized to fabricate an LSI array that meets these requirements.

Figure 4:
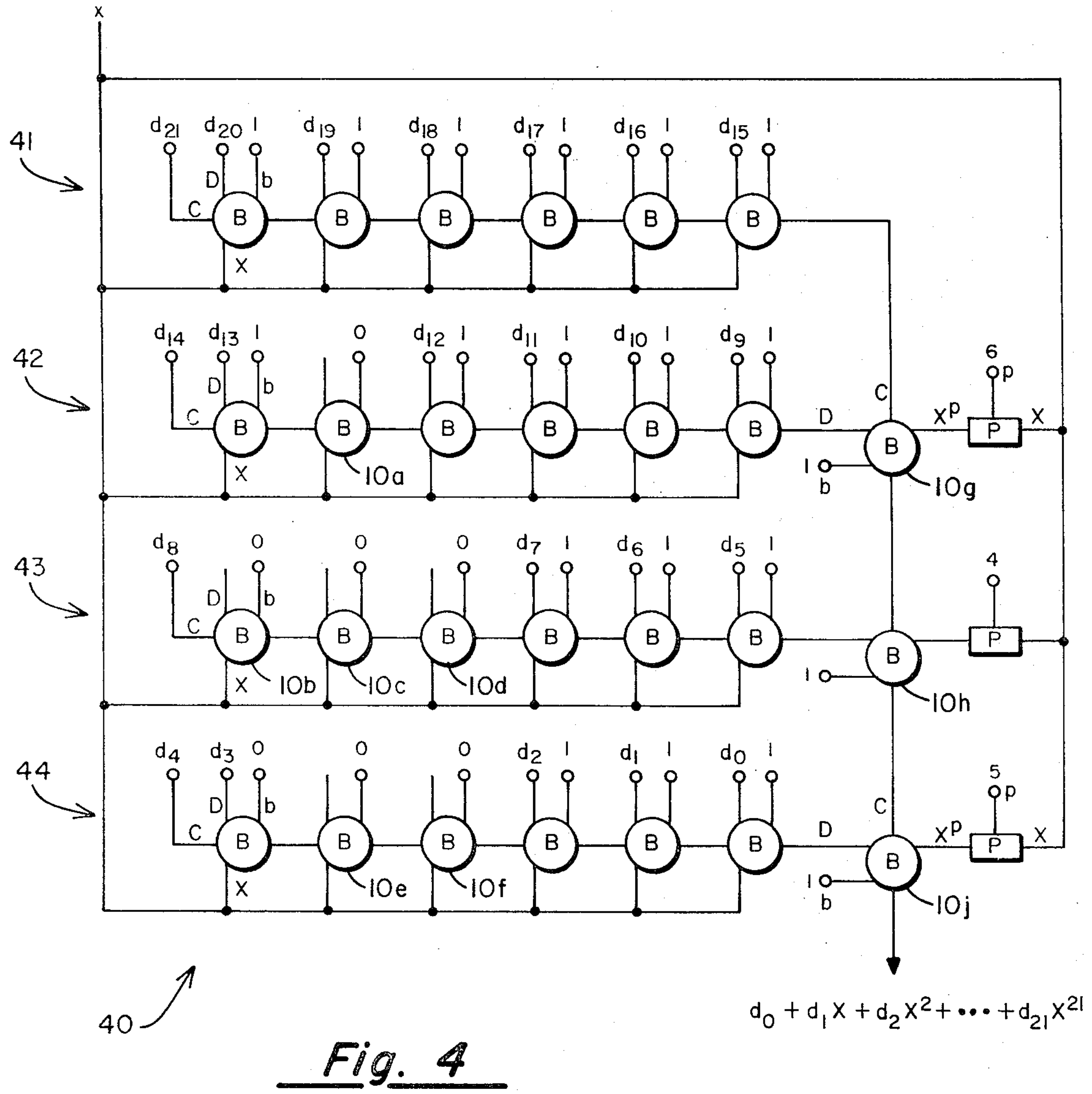
FIG. 4 is an LSI array of the modules of FIG. 1.

With particular reference to FIG. 4 there is presented an illustration of an LSI array 40 that incorporates a plurality of modules 10 and that is capable of functioning even though one or more modules 10 are faulty. Array 40 is a linear tree that incorporates a plurality of modules 10 each of which because of its bypass feature may, if upon production testing be found to be faulty, permit the multibit input signal C to pass through unmodified to the next cascaded unbypassed module 10. The only requirement being that a sufficient number of surplus modules 10 be provided in array 40 to compensate for the maximum number of faulty modules 10, e.g., modules 10*a*, 10*b*, 10*c*, 10*d*, 10*e*, 10*f*, that can be expected to be realized in the production thereof.

Figure 5:
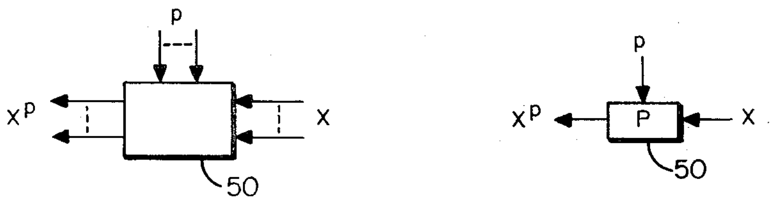
FIG. 5 is a block diagram of the power-of-X generator utilized to implement the array of FIG. 4.

To implement the desired algorithms, array 40 may include a plurality of power-of-X generators 50; FIG. 5 is an illustration of the block diagram and symbol therefor of a well-known generator 50 having multibit first and second binary input signals X and p for generating the multibit binary output signal $X^p$. Using an array 40 of 27 modules 10 and three generators 50 the array 40 is capable of generating the polynomial of degree 27, i.e., $$d_0 + d_1x + d_2x^2 + d_3x^3 + \ldots d_{27}x^{27}.$$

However, assuming that a certain number of such modules 10 in the production array 40 would be faulty, e.g., assume that a maximum of six modules 10 would be faulty, array 40 would be designed to be capable of generating the polynomial of degree 21, i.e., $$d_0 + d_1x + d_2x^2 + d_3x^3, \ldots d_{21}x^{21}.$$

With the design capability of array 40 being, i.e., the generation of the polynomial degree 21, the array 40 would be tested for faulty modules 10 and such faulty modules 10, plus any other nonfaulty modules 10 to total six modules 10, would be wired to receive on their single bit input signal *b* a logic 0 while the remaining 21 modules 10 would be wired to receive on their single bit input signal *b* a logic 1.

Because of the bypassable feature of the modules 10, a linear tree of modules 10 has a functional capability depending on only its number of unbypassed modules 10 not on their location within the linear tree. Thus, if the capability desired requires *k* modules 10, provision of *j* extra modules 10 provides for up to *j* faulty modules 10 anywhere in the cascaded portions of the linear tree. Failure of a linearly cascaded module 10 that is in a linear cascaded branch 41, 42, 43, 44 of the linear tree 40 saves the entire branch while failure of a bifurcating module 10*g*, 10*h*, 10*j* (a module 10 receiving both C and D input signals from other branches) saves the branch that it bypassed (input signal C) but loses the other branch (input signal D). However, additional modules 10 could be provided to accommodate the loss a bifurcating module 10. Thus, it can be seen that an array of the bypassable arithmetic linear module 10 of the present invention can be implemented in an LSI linear tree to generate a polynomial of any desired degree while providing for the loss of faulty modules 10 within the array.

What is claimed is:

1. A binary bypassable arithmetic linear module, comprising: a binary arithmetic linear module, comprising;

a binary multiplier having the binary input signal C as a first input signal and the binary input signal X as a second input signal for generating the binary output signal CX;

a first binary adder having the binary input signal D as a first input signal and said binary output signal CX as a second input signal for generating the binary arithmetic linear module output signal CX + D; a binary bypass switch, comprising;

a first binary AND gate having said binary arithmetic linear module output signal CX + D as a first input signal and a binary signal b as a second input signal for emitting said binary arithmetic linear module output signal CX + D only if said binary signal $b = 1$;

an inverter having said binary signal b as an input signal b for generating an inverter output signal $\bar{b}$;

a second binary AND gate having said inverter output signal $\bar{b}$ as a first input signal and said binary input signal C as a second input signal for emitting said binary input signal C only if said inverter output signal $\bar{b} = 1$;

a binary OR gate having as a first input signal said binary input signal C as emitted from said second binary AND gate and having as a second input signal said binary arithmetic linear module output signal CX + D as emitted from said first binary AND gate for emitting, as the binary bypassable arithmetic linear module output signal, said bindary arithmetic linear module output signal CX + D if said binary signal $b = 1$, or, alternatively, said binary input signal C if said inverter output signal $\bar{b} = 1$.

2. A binary bypassable arithmetic linear module, comprising:

a multibit binary arithmetic linear module, comprising;

a multibit binary multiplier having the multibit binary input signal C as a first input signal and the multibit binary input signal X as a second input signal for generating the multibit binary multiplier multibit binary output signal CX;

a first multibit binary adder having the multibit binary input signal D as a first input signal and said multibit binary multiplier multibit binary output signal CX as a second input signal for generating the multibit binary arithmetic linear module multibit binary output signal CX + D; a multibit binary bypass switch, comprising;

a first multibit binary AND gate having said multibit binary arithmetic linear module multibit binary output signal CX + D as a first input signal and a single-bit binary signal *b* as a second input signal for generating the first multibit binary AND gate multibit binary output signal *CX + D* only if said single-bit binary signal $b = 1$;

an inverter having said single-bit binary signal *b* as an input signal b for generating an inverter single-bit binary output signal $\bar{b}$;

a second multibit binary AND gate having said inverter single-bit binary output signal $\bar{b}$ as a first input signal and said multibit binary input signal C as a second input signal for generating the second multibit binary AND gate multibit binary output signal C only if said inverter single-bit binary output signal $\bar{b} = 1$;

a multibit binary OR gate having said second multibit binary AND gate multibit binary output signal C as a first input signal and said first multibit binary AND gate multibit binary output signal CX + D as a second input signal for generating the multibit binary bypassable arithmetic linear module multibit binary output signal C if $\bar{b} = 1$, or, alternatively, $CX + D$ if $b = 1$.

* * * * *

UNITED STATES PATENT OFFICE

CERTIFICATE OF CORRECTION

Patent No. 3,818,202 Dated June 18, 1974

Inventor(s) James T. Ellison

It is certified that error appears in the above-identified patent and that said Letters Patent are hereby corrected as shown below:

Claims 1 and 2, should appear as shown on the attached sheets.

Signed and sealed this 14th day of January 1975.

(SEAL)
Attest:

McCOY M. GIBSON JR.
Attesting Officer

C. MARSHALL DANN
Commissioner of Patents

1. A binary bypassable arithmetic linear module, comprising:

a binary arithmetic linear module, comprising;

a binary multiplier having the binary input signal C as a first input signal and the binary input signal X as a second input signal for generating the binary output signal CX;

a first binary adder having the binary input signal D as a first input signal and said binary output signal CX as a second input signal for generating the binary arithmetic linear module output signal CX + D;

a binary bypass switch, comprising;

a first binary AND gate having said binary arithmetic linear module output signal CX + D as a first input signal and a binary signal b as a second input signal for emitting said binary arithmetic linear module output signal CX + D only if said binary signal b = 1;

an inverter having said binary signal b as an input signal b for generating an inverter output signal $\bar{b}$;

a second binary AND gate having said inverter output signal $\bar{b}$ as a first input signal and said binary input signal C as a second input signal for emitting said binary input signal C only if said inverter output signal $\bar{b}$ = 1;

a binary OR gate having as a first input signal said binary input signal C as emitted from said second binary AND gate and having as a second input signal said binary arithmetic linear module output signal CX + D as emitted from said first binary AND gate for emitting, as the binary bypassable arithmetic linear module output signal, said binary arithmetic linear module output signal CX + D if said binary signal b = 1, or, alternatively, said binary input signal C if said inverter output signal $\bar{b}$ = 1.

2. A binary bypassable arithmetic linear module, comprising:

a multibit binary arithmetic linear module, comprising;

a multibit binary multiplier having the multibit binary input signal C as a first input signal and the multibit binary input signal X as a second input signal for generating the multibit binary multiplier multibit binary output signa CX;

a first multibit binary adder having the multibit binary input signal D as a first input signal and said multibit binary multiplier binary output signal CX as a second input signal for generating the multibit binary arithmetic linear module multibit binary output signal CX + D;

a multibit binary bypass switch, comprising;

a first multibit binary AND gate having said multibit binary arithmetic linear module multibit binary output signal CX + D as a first input signal and a single-bit binary signal b as a second input signal for generating the first multibit binary AND gate multibit binary output signal CX + D only if said single-bit binary signal b = 1;

an inverter having said single-bit binary signal b as an input signal b for generating an inverter single-bit binary output signal $\bar{b}$;

a second multibit binary AND gate having said inverter single-bit binary output signal $\bar{b}$ as a first input signal and said multibit binary input signal C as a second input signal for generating the second multibit binary AND gate multibit binary output signal C only if said inverter single-bit binary output signal $\bar{b}$ = 1;

a multibit binary OR gate having said second multibit binary AND gate multibit binary output signal C as a first input signal and said first multibit binary AND gate multibit binary output signal CX + D as a second input signal for generating the multibit binary bypassable arithmetic linear module multibit binary output signal C if $\bar{b} = 1$, or, alternatively, CX + D if b = 1.